United States Patent [19]

Parsons et al.

[11] Patent Number: 5,056,746
[45] Date of Patent: Oct. 15, 1991

[54] TABLE LEG LOCK

[75] Inventors: Kermit Parsons, White Pigeon, Mich.; John S. Chabot, Mishawaka, Ind.; Roger Bomgaars, Augusta, Mich.

[73] Assignee: Mid America Sales Company, Inc., Elkhart, Ind.

[21] Appl. No.: 580,162

[22] Filed: Sep. 10, 1990

[51] Int. Cl.$^5$ ............................................. F16M 11/16
[52] U.S. Cl. ...................................... 248/188; 403/328
[58] Field of Search ............... 248/519, 158, 539, 511, 248/188.1, 188; 296/65.1, 63; 108/18, 44, 42; 403/361, 372, 329, 328; 52/297, 298

[56] References Cited

U.S. PATENT DOCUMENTS

| 546,161 | 9/1985 | Kimball | 52/297 |
| 872,410 | 12/1907 | Granms | 108/44 |
| 1,924,858 | 8/1933 | Hopp | 403/327 X |
| 3,168,341 | 2/1965 | Beaudet | 403/327 |
| 3,391,960 | 7/1968 | Megargle | 108/44 X |
| 3,664,617 | 5/1972 | Fewick | 248/539 |
| 3,884,587 | 5/1975 | Caldwell | 403/328 X |
| 4,470,633 | 9/1984 | Fourrey | 403/361 X |
| 4,582,287 | 4/1986 | Deleary | 248/539 X |
| 4,587,921 | 5/1986 | Currey | 114/363 |

Primary Examiner—J. Franklin Foss
Attorney, Agent, or Firm—James D. Hall

[57] ABSTRACT

A table leg lock having a spring clip carried by a plate for engaging an annular groove in the table leg. The spring clip when pulled laterally engages a pair of flanges to spread the clip for removal of the table leg. The leg lock has application when supported by a floor or connected to the underside of a table surface.

7 Claims, 3 Drawing Sheets

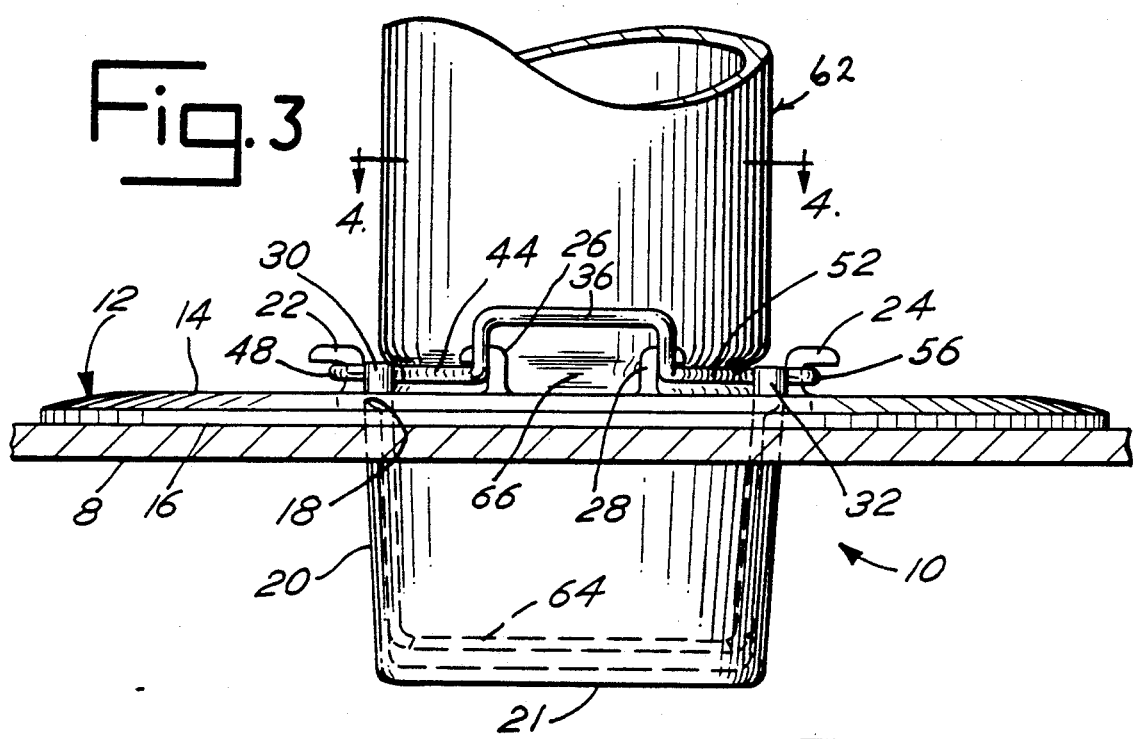
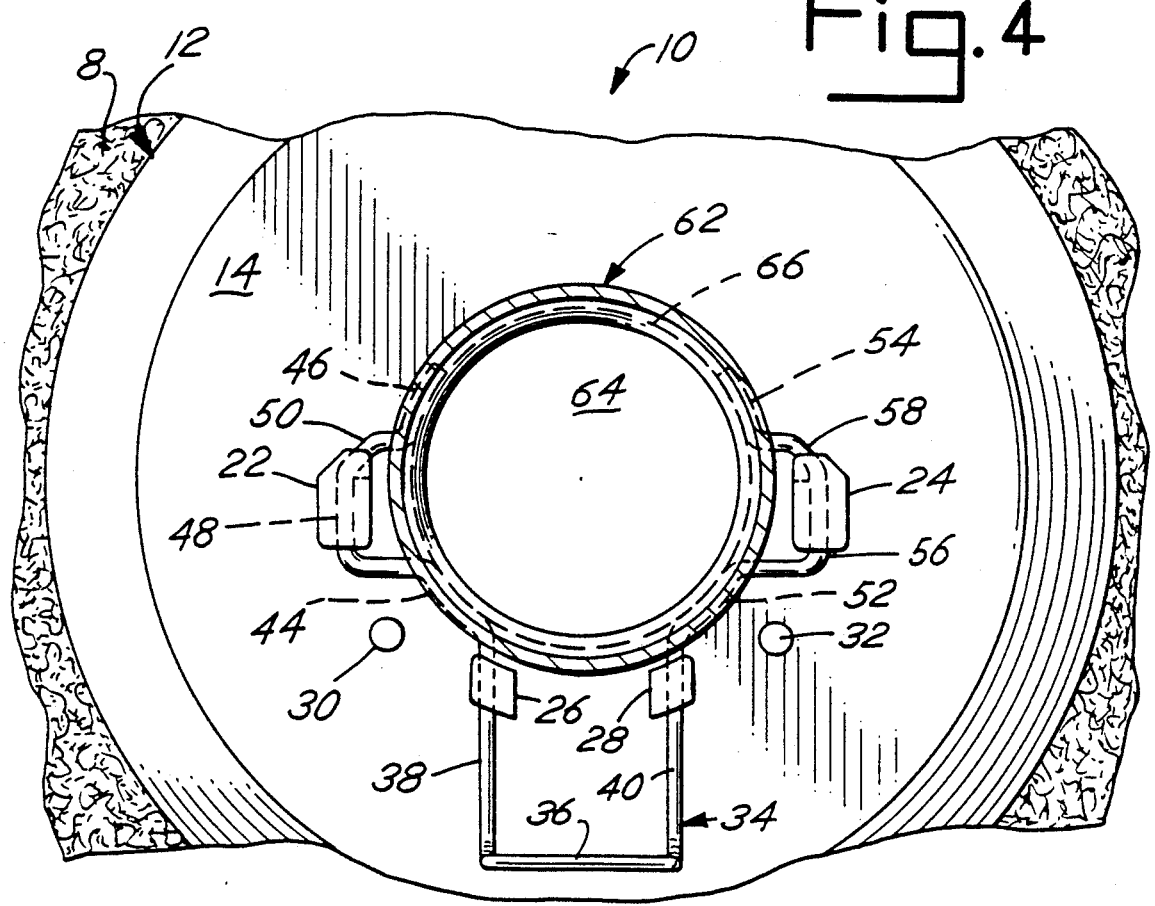

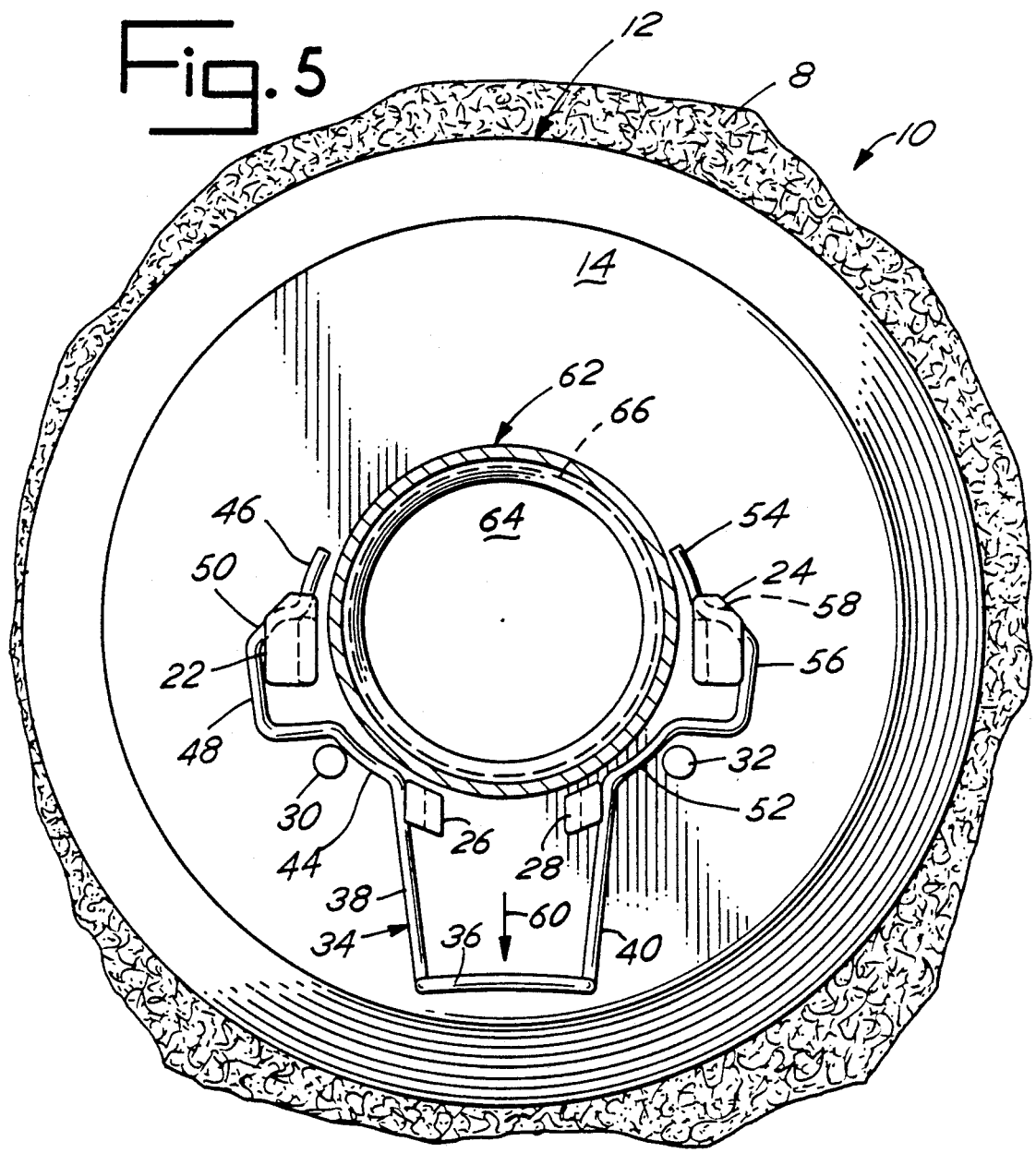

TABLE LEG LOCK

FIELD OF THE INVENTION

This invention relates to a table leg lock which may be used in recreational vehicles, patio decks, and similar table supporting foundations where it is desirable to remove the table.

SUMMARY OF THE INVENTION

The table leg lock of this invention includes a socket plate carrying a spring clip about a center opening and a table leg having an annular groove near one end. The spring clip is shiftably carried by the plate about the central opening for engagement with the annular groove of the table leg to lock the leg against longitudinal movement. The spring clip may be shifted into an open position to release the leg for removal. As the spring clip is shifted into its open position, flanges engage the clip to cam the clip ends outwardly to clear the table leg groove. After release, the spring clip is cammed back into its locking position.

Accordingly, it is an object of this invention to provide for a novel table leg lock.

Another object of this invention is to provide for a table leg lock having a spring clip.

Another object of this invention is to provide for a table leg lock adaptable for connection to a floor structure or to the underside of a table top.

Other objects of the invention will become apparent upon a reading of the following description taken with the accompanying drawings.

BRIEF DESCRIPTION OF THE DRAWINGS

FIG. 3 is a side elevational view of FIG. 1.

FIG. 4 is a sectional view taken from line 4—4 of FIG. 3.

FIG. 5 is the sectional view of FIG. 4 with the spring clip in the open position.

DESCRIPTION OF THE PREFERRED EMBODIMENTS

Figure 1:
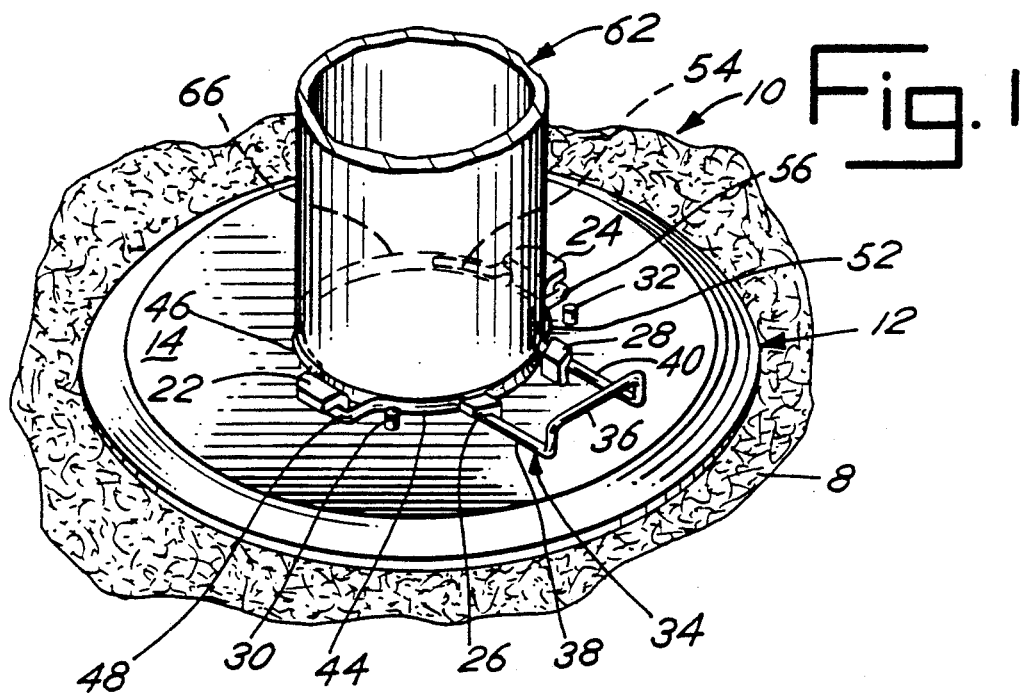
FIG. 1 is a fragmented perspective view of the table leg lock of the invention shown in association with a floor structure.

The preferred embodiment of this invention is not intended to limit or restrict the invention to the precise form disclosed. Rather, it is chosen and described in order to best describe the invention so that others skilled in the art may utilize its teachings.

Initially, it should be understood that while the table leg lock of the invention is illustrated connected to a floor structure, the invention is equally applicable in connection to the underside of a table top with only minor modifications to the plate required.

As illustrated in the drawings, table leg lock 10 includes a socket plate 12 having an outer surface 14 and inner surface 16. Plate 12 is illustrated as having a circular periphery and further includes a central opening 18 into socket part 20 which extends from the inner surface, as illustrated. In the figures, plate 12 is supported upon floor 8 with socket part 20 accommodated by an opening within the floor. Socket part 20 includes an end wall 21. A pair of inverted L-shaped flanges 22, 24 extend outwardly from plate outer surface 14 adjacent opening 18 in a diametrically opposite relationship to one another. A pair of spaced guides 26, 28 extend outwardly from surface 14 at one side of opening 18 between flanges 22, 24. A pair of stops 30, 32 extend from plate surface 14 and are positioned between flange 22 and guide 26 and flange 24 and guide 28 respectively as illustrated.

Figure 2:
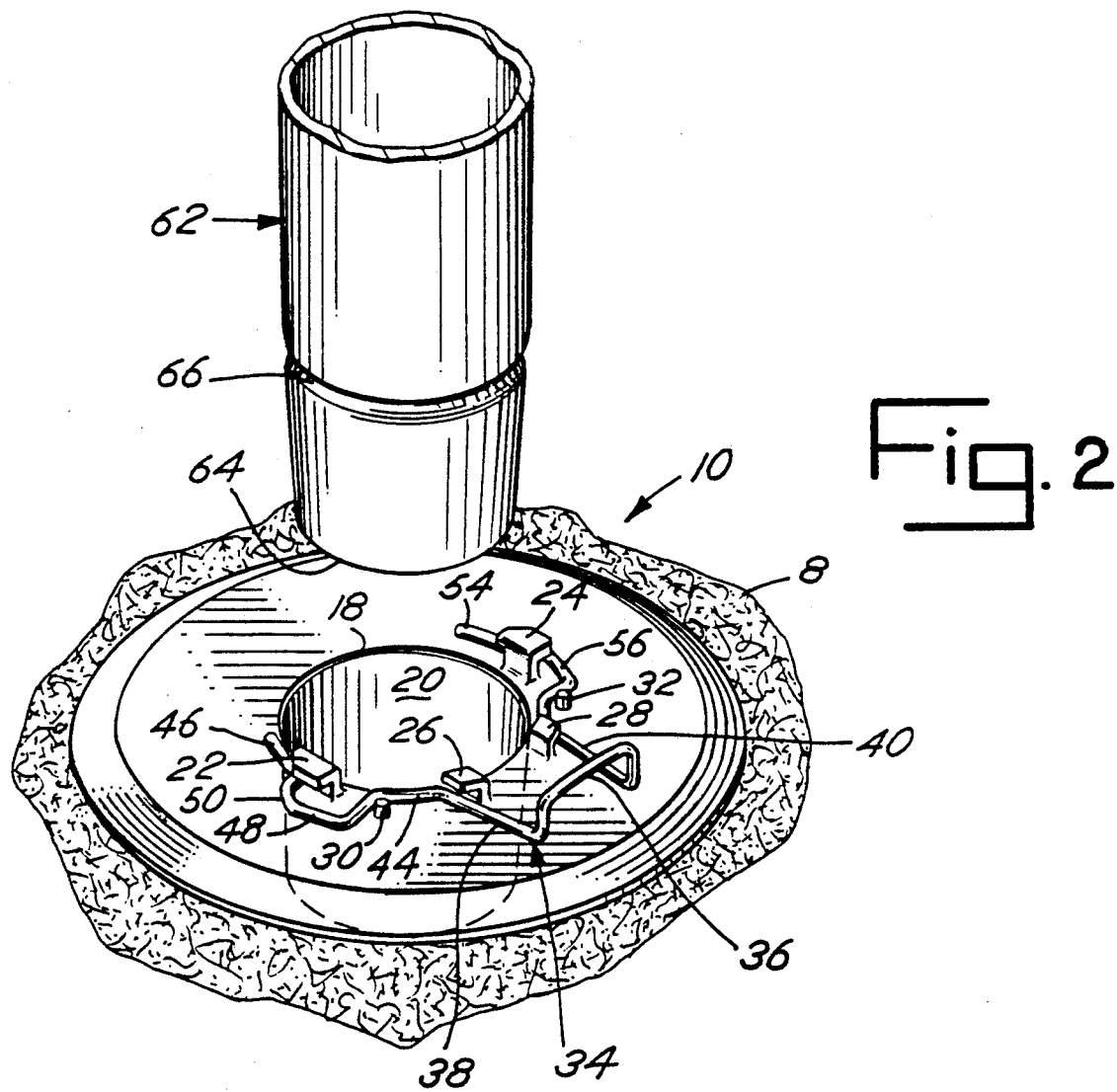
FIG. 2 is the perspective view of FIG. 1 with the table leg lock in the unlocked position and the table leg removed.

A spring clip 34 is shiftably carried by plate 12 over outer surface 14 and retained by flanges 22, 24 and guide 26, 28. Spring clip 34 includes a handle 36 and spaced legs 38, 40 extending from the handle. Handle 36 is bent away from surface 14 at an approximate 90° angle from clip legs 38, 40. Clip leg 38 includes a proximal arcuate section 44, and a distal arcuate section 46 separated by a generally C-shaped section 48. C-shaped section 48 includes an angled component 50 near arcuate section 46. Similarly leg 40 includes a proximal arcuate section 52 and a distal arcuate section 54 separated by a C-shaped section 56. Section 56 includes an angled component 58 near its arcuate section 54. As illustrated in FIG. 4, sections 48 and 56 of spring clip 34 are fitted about plate flanges 22, 24 with its legs 38, 40 fitted about plate guides 26, 28 when the clip is in its locking position. Spring clip 34 is shiftable relative to plate 12 between a locking position of FIGS. 1, 3 and 4 and the unlocked position of FIGS. 2 and 5. In its locking position, arcuate sections 44, 46, 52, 54 of legs 38 and 40 are inset relative to opening 18 of plate 12. In its unlocked position, legs 38 and 40 of the clip are spread by flanges 22, 24 with the arcuate sections of the legs being shifted outwardly of opening 18.

A table leg 62, only partially shown, is sized for an accommodating snug fit within socket part 20. Leg 62 is preferably tapered towards its end 64 so as to more easily be positioned in the socket part. An annular groove 66 is formed about leg 62 near its end 64. The upper end of leg 62 which is not shown will be connected to a table top.

In use, with clip 34 in its locking position table leg 62 is inserted into opening 18 and down into socket part 20. The arcuate sections of spring legs 38 and 40 slide over the outer tapered surface of leg 62 which urges the legs slightly outwardly. When the spring clip legs 38, 40 are in alignment with table leg groove 66, the legs spring together to seat their arcuate sections 44, 46, 52, 54 within groove 66 to secure the leg against longitudinal movement relative to plate 12.

To release table leg 62, a user grasps handle 36 and pulls in the direction of arrow 60 of FIG. 5. As spring clip 34 is pulled in the direction of arrow 60 away from the leg, angled sections 50, 58 of leg sections 48, 56 engage flanges 22, 24 to cam legs 38 and 40 away from one another. This shifts the arcuate leg sections 44, 46, 52, 54 of the clip out of table leg groove 66. C-shaped sections 48, 56 of the clip contact stops 30, 32 to halt further movement of the spring clip in the direction of arrow 60 with the clip remaining connected to plate 12. With the clip's arcuate leg sections removed from groove 66, the table leg may be pulled and disconnected from plate 12. Spring clip 34 shifts back into its locking position of FIGS. 1, 3 and 4 after being released by the user due to the camming contact of clip components 50, 52 with plate flanges 22, 24.

It should be understood that, while the invention is illustrated as a table leg lock carried by the vehicle floor 8, the leg lock of the invention is equally applicable to connect the leg to the table top.

It should be further understood that the invention is not to be limited to the precise forms disclosed but rather may be modified within the scope of the appended claims.

We claim:

1. A lock for accommodating a table leg having an annular groove, said lock adapted for locking said leg against longitudinal movement relative to the lock, said lock comprising a plate having an inner surface adapted for mounting to a supporting surface and an outer surface, an opening in said plate for accommodating said table leg, a spring clip having a plurality of arcuate sections being shiftably carried by said plate, said clip being shiftable relative to said plate between a locking position wherein said arcuate sections protrude into said opening and an unlocked position wherein said arcuate sections are withdrawn from said opening, said arcuate sections being adapted for engagement with said table leg at its said groove when said clip is in its said locking position with the table leg extending into said plate opening.

2. The lock of claim 1 wherein said plate includes a pair of protrusions extending outwardly from its said outer surface and contacting said clip, said protrusions constituting camming means for urging said clip arcuate sections laterally outwardly to withdraw the sections from said opening.

3. The lock of claim 2 wherein said clip includes other sections for accommodating said protrusions when said clip is in its locking position, said clip having a pair of opposed legs located on opposite sides of said opening, said legs formed to constitute said arcuate sections, said clip further including a handle interconnecting said legs.

4. In combination, a table leg lock and a table leg, said table leg having a longitudinal tube, said tube having an annular groove formed therein, said lock including a plate having an opening therethrough for supportedly accommodating said table leg, latch means carried by said plate for preventing longitudinal shifting of said leg relative to said plate, said latch means engaging said leg fitted into said plate opening at said groove and being shiftable between a locked position in engagement with said leg and an unlocked position.

5. The combination of claim 4 wherein said latch means includes a clip having portions substantially conforming to the periphery of said leg at said groove, said clip portions being inward of said opening for engagement within groove when said latch means is in its locked position, said clip portions being withdrawn from engagement with said groove when said latch means is shifted into its unlocked position.

6. The combination of claim 5 wherein said clip includes a pair of legs biased in facing alignment, each of said clip legs having said conforming clip portions and a camming part, each said camming part engaging a protrusion carried by said plate as said latch means is laterally shifted from its locked position to shift at least one of said clip portions on each leg from said leg groove.

7. The combination of claim 6 further including stop means carried by plate for contacting said latch means when said latch means is in its unlocked position.

* * * * *